United States Patent Office 3,225,003
Patented Dec. 21, 1965

3,225,003
LINEAR COPOLYESTER OF HYDROQUINONE WITH A MIXTURE OF HEXAHYDROISOPHTHALIC AND HEXAHYDROTEREPHTHALIC ACIDS
Arthur R. Macon, Kinston, N.C., assignor to E. I. du Pont de Nemours and Company, Wilmington, Del., a corporation of Delaware
No Drawing. Filed Jan. 29, 1962, Ser. No. 169,644
7 Claims. (Cl. 260—47)

This invention relates to novel aromatic copolyesters, as well as to fibers, films, and other shaped articles produced therefrom.

A large number of synthetic linear condensation polymers have been evaluated in attempts to improve on the properties of the commercial polyester fiber, polyethylene terephthalate, but all were found deficient in one or more respects. My research included an investigation of the polymer of hydroquinone with hexahydroisophthalic acid. This polyester, polyphenylene hexahydroisophthalate, has promise, since the starting materials from which it may be derived are readily available, and the polyester product is adaptable for spinning tenacious fibers which have a high degree of stability when exposed to light, either outdoors or indoors. Unfortunately, however, fibers prepared from this polyester are deficient in that they are sensitive to many solvents, including dry cleaning solvents. Moreover, the fibers are too sensitive to heat for wash-and-wear fabrics. When fabrics containing the fibers are exposed to hot water, any wrinkles or deformations formed in the fabric while hot become set after cooling. The latter phenomenon apparently result from the relatively quite low second order transition temperature, $T_g$, of the polyester.

It is an object of this invention to provide a novel copolyester from which can be prepared fibers characterized by insensitivity to common solvents as well as by a second order transition temperature above the boiling point of water. Other objects will be apparent from the following description and claims.

I have found that the desired properties can be obtained from a novel copolyester derived from hydroquinone and a mixture of hexahydroterephthalic acid and hexahydroisophthalic acid. More specifically, the invention comprises a novel linear copolyester formed from reactants consisting essentially of (a) hydroquinone and (b) a mixture of dicarboxylic acids consisting essentially of 50 to 75 mol percent hexahydroisophthalic acid and 50 to 25 mol percent hexahydroterephthalic acid, the mol percentages of said dicarboxylic acids totalling 100 mol percent; said copolyester having an intrinsic viscosity, measured in a solution of 1 part by volume of trifluoroacetic acid and 3 parts by volume of methylene chloride, of at least 0.3. Also contemplated in accordance with the invention are fibers, films, and other shaped articles prepared from the novel copolyester.

Alternately, the novel copolyester may be defined as a linear polymer consisting essentially of a succession of recurring structural units of the formulas

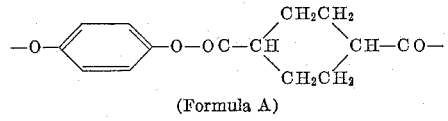

(Formula A)

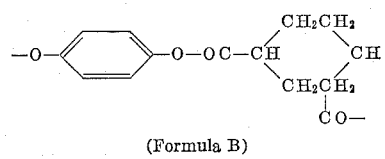

(Formula B)

wherein the polymer contains one recurring structural unit of Formula A for each one to three recurring structural units of Formula B.

The copolyesters of the invention are prepared by reacting hydroquinone diacetate with a mixture of hexahydroterephthalic acid and hexahydroisophthalic acid at elevated temperatures in the presence of a catalyst such as sodium acetate. The reaction may be modified in various ways in accordance with known technology for forming polyesters; i.e., if desired, hydroquinone diacetate may be formed in situ by adding hydroquinone and acetic anhydride to the starting material reaction mixture. Other known methods may be employed to form the polymer. For instance, a mixture of diphenyl hexahydroterephthalate and diphenyl hexahydroisophthalate may be reacted with hydroquinone in the presence of sodium acetate as a catalyst. In an alternate method, a solution of a mixture of hexahydroterephthaloyl chloride and hexahydroisophthaloyl chloride in an organic solvent such as 1,1,2-trichloroethane may be added to a rapidly stirred solution of hydroquinone in aqueous sodium hydroxide. Still other methods will be apparent to those skilled in the art.

As used herein, the term "hexahydroterephthalic acid" refers to the compound otherwise known as 1,4-cyclohexanedicarboxylic acid, and the term "hexahydroisophthalic acid" refers to the compound otherwise known as 1,3-cyclohexanedicarboxylic acid. Each of these acids had been isolated in two forms, cis- and trans-. In the preparation of polyesters from these acids and hydroquinone diacetates, however, it has been observed that equilibration usually occurs between the cis- and trans- forms and that the polyester therefore contains a mixture of the forms no matter whether the pure cis- forms, the pure trans- forms, or a mixture of the forms is employed as the starting material acid.

While the novel copolyester of the invention consists essentially of repeating structural units composed of hydroquinone esters of hexahydroterephthalic acid and hexahydroisophthalic acid, relatively small amounts of other copolymeric repeating structural units may be present to modify the properties of the polymer. For example, 1 mol of hydroquinone may be reacted with a mixture of 0.485 mol of diphenyl hexahydroterephthalate, 0.485 mol of diphenyl hexahydroisophthalate, and 0.03 mol of sodium 3,5-di(phenoxycarbonyl)benzenesulfonate to form a sulfonate-modified copolyester which is readily dyeable with basic dyes. Similarly, 0.03 mol of sodium diphenyl trimesate may be substituted in place of the sodium 3,5-di(phenoxycarbonyl)benzenesulfonate to form a basically dyeable, modified copolyester. Similar minor modifications of the copolyester, in which the copolyester remains essentially comprised of repeating structural units of hydroquinone esters of hexahydroterephthalic acid and hexahydroisophthalic acid, will be apparent to those skilled in the art.

The term "intrinsic viscosity," as used herein, is defined as the limit of the fraction $$\frac{\ln(r)}{c}$$

as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units a 25° C. Intrinsic viscosity is a measure of the degree of polymerization.

The expression "second order transition temperature," designated herein by the symbol "$T_g$," is defined as the temperature at which a discontinuity occurs in the curve of a first derivative thermodynamic quantity when plotted as a function of the polymer temperature. It is correlated with yield temperature and polymer fluidity and can be observed from a plot of density, specific volume, specific heat, sonic modulus, or index or refraction against temperature. $T_g$ is sometimes also known as the "glass transition temperature" because it is the temperature below which the polymer exhibits glass-like behavior; above $T_g$ the polymer is somewhat more rubber-like. A convenient method for determining $T_g$ for a given sample of polymer is given by Pace in his U.S. Patent No. 2,556,295 (column 3, line 24, to column 4, line 19).

Specific embodiments of the invention are illustrated in the following examples, which describe the preparation of the novel copolyester of the invention as well as desirable properties thereof, but the examples are not intended to be limitative.

*Example 1*

(A) A charge consisting of 19.4 grams (0.1 mol) of hydroquinone diacetate, 5.7 grams (0.033 mol) of hexahydroterephthalic acid, 11.5 grams (0.067 mol) of hexahydroisophthalic acid, 0.04 gram of anhydrous sodium acetate, and 18 ml. of a eutectic mixture of diphenyl and diphenyl oxide (commercially available from the Dow Chemical Co. as "Dowtherm" A) is placed in a reaction flask fitted with a nitrogen inlet, stirrer, distilling head, and heating bath. The apparatus is swept out with nitrogen and then heated to 230° C. with the acid of a Wood's metal bath. The polymerization reaction proceeds with evolution of acetic acid until no more acetic acid distills from the mixture (about 2¼ hours). The nitrogen sweep is maintained throughout the course of the reaction. The mixture is then removed from the flask and placed in a polymer tube equipped with a capillary extending to the bottom of the tube. The tube is heated under a vacuum of 2 mm. of mercury and a nitrogen flow of 1 ml./min. for 2 hours at 115° C., 2 hours at 125° C., and 1.5 hours at 150° C. to remove the diphenyl and diphenyl oxide. After the material is cooled, it is powdered and then heated for 18 hours at 175° C. under a stream of nitrogen. The product, poly(phenylene hexahydroisophthalate/hexahydroterephthalate) (67/33), is a tough white polymer having an intrinsic viscosity of 0.67.

Polymers (B), (C), (D) and (E) are prepared by the process of Example 1(A), but using different amounts of hexahydroisophthalic acid (HI) and hexahydroterephthalic acid (HT). The amounts used and the results are given in the following table. "Crystalline melting point" (C.M.P.) refers to the temperature at which the last trace of birefringence disappears when a sample of polymer is heated slowly on the hot stage of a microspoce between crossed Nichol prisms.

|     | Grams HT | Grams HI | Mol Ratio, HI/HT | C.M.P. (degs.) | $T_g$ (degs.) |
|-----|----------|----------|------------------|----------------|---------------|
| (A) | 5.7      | 11.5     | 67/33            | 230            | 126           |
| (B) | 8.6      | 8.6      | 50/50            | 330            |               |
| (C) | 4.3      | 12.9     | 75/25            |                | 111           |
| (D) | 0        | 17.2     | 100/0            | 180            | 52            |
| (E) | 17.2     | 0        | 0/100            | Infusible      |               |

*Example 2*

(A) A molten sample of the 67/33 HI/HT polymer is melt spun at 280° C. into filaments and then drawn 1.7x over a 150° C. pin, using conventional techniques. The drawn yarn is insoluble in 60° C. tetrachloroethylene.

(B) Filaments similarly spun and drawn from the 50/50 HI/HT polymer are also found to be insoluble in the warm tetrachloroethylene.

(C) Drawn filaments of 75/25 HI/HT, while swollen by the solvent, do not dissolve in 60° C. tetrachloroethylene.

(D) Drawn filaments of 100/0 HI/HT polymer dissolve in tetrachloroethylene at 60° C.

All of the filaments prepared as described above have a high degree of stability to light, as shown by the absence of any color break in any of the samples after 88 hours of continuous exposure to light generated by an xenon arc source (employing a Xenotest W Original Hanau instrument, manufactured by Quarzlampen Gesellschaft m.b.H., Hanau. and distributed by G. F. Bush Associates of Princeton, N.J.). In this instrument, one hour of exposure is equivalent to 25 hours of midday Florida sunlight.

The 0/100 HI/HT polymeric product, poly(phenylene hexahydroterephthalate), is highly crystalline and insoluble. The polyester is infusible when tested at temperatures up to 400° C., and it is impracticable to prepare filaments from this polyester via melt spinning techniques.

Since many different embodiments of the invention may be made without departing from the spirit and scope thereof, it is to be understood that the invention is not limited by the specific illustrations except to the extent defined in the following claims.

What is claimed is:

1. The fiber-forming polymeric linear copolyester consisting essentially of poly(phenylene hexahydroisophthalate/hexahydroterephthalate).

2. The fiber-forming polymer consisting essentially of a linear copolyester of hydroquinone with a mixture of 50 to 75 mol percent of hexahydroisophthalic acid and 50 to 25 mol percent of hexahydroterephthalic acid.

3. The copolyester characterized as a fiber-forming linear polymer consisting essentially of a succession of structural units represented by the formulas

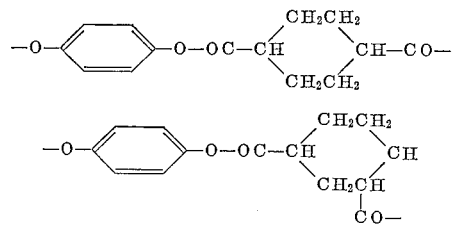

the relative ratio of the first of said units to the second being within the range of 1/1 to 1/3.

4. Fibers of a linear copolyester having an intrinsic viscosity of at least 0.3, measured in solution at 25° C. in 1 part by volume of trifluoroacetic acid and 3 parts by volume of methylene chloride, said copolyester consisting essentially of poly(phenylene hexahydroisophthalate/hexahydroterephthalate).

5. Fibers as defined in claim 4 wherein the said copolyester is composed of recurring structural units represented by the formulas

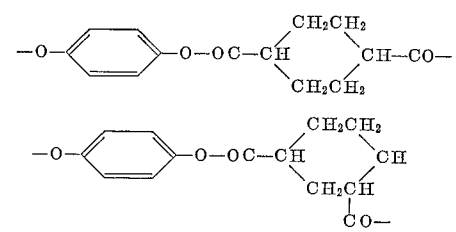

the relative ratio of the first of said units to the second being within the range 1/1 to 1/3.

6. Fibers as defined in claim 4 wherein said copolyester is hydroquinone ester of a mixture of hexahydroisophthalic and hexahydroterephthalic acids in about 67/33 mol ratio, and is further characterized by having a crystalline melting point of about 230° C. and by being insoluble in tetrachloroethylene.

7. Fibers as defined in claim 4 wherein said copolyester is a hydroquinone ester of a mixture of hexahydroisophthalic and hexahydroterephthalic acids in about equal mol ratio, and is further characterized by having a crystalline melting point of about 330° C. and by being insoluble in tetrachloroethylene.

References Cited by the Examiner

UNITED STATES PATENTS

| 2,595,343 | 5/1952 | Drewitt et al. | 260—47 |
| 2,901,466 | 8/1959 | Kibler et al. | 260—75 |
| 3,033,826 | 5/1962 | Kibler et al. | 260—47 |

WILLIAM H. SHORT, *Primary Examiner.*

LOUISE P. QUAST, *Examiner.*